(12) United States Patent
Park et al.

(10) Patent No.: US 9,756,321 B2
(45) Date of Patent: Sep. 5, 2017

(54) THREE-DIMENSIONAL IMAGE DISPLAY DEVICE AND METHOD OF DISPLAYING THREE DIMENSIONAL IMAGE

(71) Applicant: SAMSUNG DISPLAY CO., LTD., Yongin, Gyeonggi-Do (KR)

(72) Inventors: Mun-San Park, Yongin (KR); Cheol Woo Park, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 485 days.

(21) Appl. No.: 14/105,790

(22) Filed: Dec. 13, 2013

(65) Prior Publication Data
US 2015/0130910 A1 May 14, 2015

(30) Foreign Application Priority Data

Nov. 13, 2013 (KR) .......................... 10-2013-0137824

(51) Int. Cl.
*H04N 13/04* (2006.01)
*H04N 13/00* (2006.01)

(52) U.S. Cl.
CPC ..... *H04N 13/0497* (2013.01); *H04N 13/0018* (2013.01); *H04N 2013/0085* (2013.01)

(58) Field of Classification Search
CPC ....... H04N 13/0402; H04N 2013/0096; H04N 13/0497; H04N 2013/0085; H04N 13/0018

(Continued)

(56) References Cited

U.S. PATENT DOCUMENTS 8,184,200 B1 * 5/2012 Biswas ................. H04N 7/014
348/443
2002/0008676 A1 * 1/2002 Miyazaki ........... G02B 27/2271
345/6

(Continued)

FOREIGN PATENT DOCUMENTS

| JP | 2011-166498 A | 8/2011 | |
| KR | WO 2013081435 A1 * | 6/2013 | ......... H04N 13/0011 |
| KR | WO 2013122419 A1 * | 8/2013 | ............... G06T 5/40 |

OTHER PUBLICATIONS

Christoph Fehn, "Depth-Image-Based Rendering (DIBR), Compression and Transmission for a New Approach on 3D-TV," 2004, 12 pages, Heinrich-Hertz-Institut (HHI), Berlin, Germany.

(Continued)

*Primary Examiner* — Zhihan Zhou
(74) *Attorney, Agent, or Firm* — Lee & Morse P.C.

(57) ABSTRACT

A three-dimensional image display device and a method for displaying a three-dimensional image, and particularly relates to a three-dimensional image display device improving movement degradation and a method for displaying a three-dimensional image. A three-dimensional image display device includes: a display panel; a movement determining unit determining whether an object of a 3D image moved in a direction perpendicular to a surface of the display panel based on image information; a hole-filling unit filling a hole generated according to the movement of the object with an edge region of the object to compensate a movement degradation when it is determined that the object moved in the direction perpendicular to the surface of the display panel; and a 3D input image signal generator generating a 3D input image signal based on the image information compensated with the movement degradation.

6 Claims, 10 Drawing Sheets

(58) Field of Classification Search
USPC .......................................................... 348/51
See application file for complete search history.

(56) References Cited

U.S. PATENT DOCUMENTS

| | | | | |
|---|---|---|---|---|
| 2007/0285366 A1* | 12/2007 | Ha | ....................... | G09G 3/3648 345/87 |
| 2008/0095439 A1* | 4/2008 | Okubo | .................... | A63F 13/10 382/180 |
| 2009/0046052 A1* | 2/2009 | Kim | ....................... | G09G 3/344 345/107 |
| 2010/0220117 A1* | 9/2010 | Kimura | ................ | G09G 3/3233 345/690 |
| 2010/0259653 A1* | 10/2010 | Kimura | ................ | G09G 3/3406 348/252 |
| 2011/0025825 A1 | 2/2011 | McNamer et al. | | |
| 2011/0115886 A1* | 5/2011 | Nguyen | ............... | H04N 13/025 348/47 |
| 2011/0142289 A1 | 6/2011 | Barenbrug et al. | | |
| 2012/0242789 A1* | 9/2012 | Cheng | ................ | H04N 13/0011 348/43 |
| 2012/0269457 A1* | 10/2012 | Vetro | ........................ | G06T 3/40 382/299 |
| 2012/0293504 A1 | 11/2012 | Choo et al. | | |
| 2014/0185860 A1* | 7/2014 | Oshima | .................. | H04N 5/445 382/100 |
| 2014/0247985 A1* | 9/2014 | Park | .......................... | G06T 5/40 382/170 |
| 2014/0333739 A1* | 11/2014 | Yang | .................. | H04N 13/0011 348/54 |

OTHER PUBLICATIONS

Stefanos Bitzakidis, "Moving-Image Enhancement on AMLCHs," Journal of the SID, Oct. 2, 1995, pp. 249-255, U.K.

* cited by examiner

THREE-DIMENSIONAL IMAGE DISPLAY DEVICE AND METHOD OF DISPLAYING THREE DIMENSIONAL IMAGE

CROSS-REFERENCE TO RELATED APPLICATION

Korean Patent Application No. 10-2013-0137824 filed on Nov. 13, 2013, in the Korean Intellectual Property Office, and entitled: "THREE-DIMENSIONAL IMAGE DISPLAY DEVICE AND METHOD OF DISPLAYING THREE-DIMENSIONAL IMAGE," is incorporated by reference herein in its entirety.

BACKGROUND

1. Field

Embodiments relate to a three-dimensional image display device and a method displaying a three-dimensional image, and, particularly, to a three-dimensional image display device improving movement degradation and a method displaying a three-dimensional image.

2. Description of the Related Art

Recently, as a display device technology has been developed, a display device capable of displaying a 3 dimensional (3D) image has attracted attention and various 3D image displaying methods have been researched.

In general, in a 3D image display technology, stereoscopic perception of an object is represented by using binocular parallax as the largest factor for recognizing stereoscopic perception in a near distance. That is, when different 2D images are reflected in a left eye and a right eye, respectively, and the image reflected in the left eye (hereinafter referred to as a "left eye image") and the image reflected in the right eye (hereinafter referred to as a "right eye image") are transferred to a brain, the left eye image and the right eye image are combined in the brain to be recognized as the 3D image having depth perception or stereoscopic perception.

The 3D image display device capable of displaying the 3D image uses the binocular parallax and includes a stereoscopic type of 3D image display device using glasses such as shutter glasses, polarized glasses, or the like, and an autostereoscopic type of 3D image display device in which an optical system such as a lenticular lens, a parallax barrier, or the like is disposed in a display device without using glasses.

The autostereoscopic type 3D image display device may display the 3D image by receiving 3D image information, or display the 3D image by a rendering method in which the 3D image is made by instilling the 3D effect in the 2D image by considering external information regarding a light source, a position, a color, and the like. The rendering method includes a method in which 2D image information and depth information is received and then the 3D image is made based on the 2D image information and the depth information.

The autostereoscopic type 3D image display device displays images so that the images may be recognized in a plurality of views for observers who are positioned at various angles.

The above information disclosed in this Background section is only for enhancement of understanding of the background and therefore it may contain information that does not form the prior art that is already known in this country to a person of ordinary skill in the art.

SUMMARY

A three-dimensional image display device according to an exemplary embodiment includes: a display panel; a movement determining unit determining whether an object of a 3D image moved in a direction perpendicular to a surface of the display panel based on image information; a hole-filling unit filling a hole generated according to the movement of the object with an edge region of the object to compensate a movement degradation in a case that it is determined that the object moved in the direction perpendicular to the surface of the display panel; and a 3D input image signal generator generating a 3D input image signal based on the image information compensated for the movement degradation.

When the object moved in the direction perpendicular to the surface of the display panel and in a first direction in a plane substantially parallel to the surface of the display panel, the hole-filling unit may fill the hole with an edge region of the object in a side opposite to the first direction.

When the object did not move in the direction perpendicular to the surface of the display panel, the hole-filling unit may fill the hole of the object with a background.

The image information may include 2D image information and depth information for a 2D image.

A signal controller receiving the 3D input image signal from the 3D input image signal generator and controlling driving of the display panel may be further included.

An inverse filtering unit generating compensation data depending on a speed of the object and add the compensation data to the image information may be further included.

The compensation data may have an inverse shape of afterimage data by the movement of the object.

The inverse filtering unit may add the compensation data to the image information of the object of a previous frame.

When the object moved in the direction perpendicular to the surface of the display panel, luminance of the object is lower than luminance of the background, and the object moved in the first direction, the inverse filtering unit may add, to the image information, the compensation data for the afterimage data of the background around the edge region of the object in a side of the first direction.

When the object moved in the direction perpendicular to the surface of the display panel, luminance of the object is higher than luminance of the background, and the object moved in the first direction, the inverse filtering unit may add, to the image information, the compensation data for the afterimage data of the edge region of the object in a side opposite to the first direction.

A method of displaying a three-dimensional image according to an exemplary embodiment includes: determining whether an object of a 3D image moved in a direction perpendicular to a surface of a display panel based on image information; compensating movement degradation when the object moved in the direction perpendicular to the surface of the display panel by filling a hole generated according to the movement of the object with an edge region of the object; and generating a 3D input image signal based on the image information compensated with the movement degradation.

When the object moved in the direction perpendicular to the surface of the display panel and in a first direction in a plane substantially parallel to the surface of the display panel, compensating movement degradation may include filling the hole with an edge region of the object at a side opposite to the first direction.

When the object does not move in the direction perpendicular to the surface, in the compensation of the movement degradation, compensating movement degradation may include filling the hole of the object with a background.

The image information may include 2D image information and depth information for a 2D image.

The method may further include controlling driving of the display panel based on the 3D input image signal.

The method may further include inverse filtering of generating compensation data depending on a speed of the object and add the compensation data to the image information.

The compensation data may have an inverse shape of afterimage data by the movement of the object.

The compensation data may be added to the image information of the object of a previous frame in the inverse filtering.

When the object moved in the direction perpendicular to the surface of the display panel, luminance of the object is lower than luminance of the background, and the object of a left eye image or a right eye image moved in the first direction, inverse filtering may include adding, to the image information, the compensation data for the afterimage data of the background around the edge region of the object at a side of the first direction.

When the object moved in the direction perpendicular to the surface of the display panel, luminance of the object is higher than luminance of the background, and the object of a left eye image or a right eye image moved in the first direction, inverse filtering may include adding, to the image information, the compensation data for the afterimage data of the edge region of the object at a side opposite to the first direction.

BRIEF DESCRIPTION OF THE DRAWINGS

Features will become apparent to those of ordinary skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Like reference numerals refer to like elements throughout.

Now, a three-dimensional image display device and a method displaying a three-dimensional image according to exemplary embodiments will be described with reference to accompanying drawings.

Figure 1:
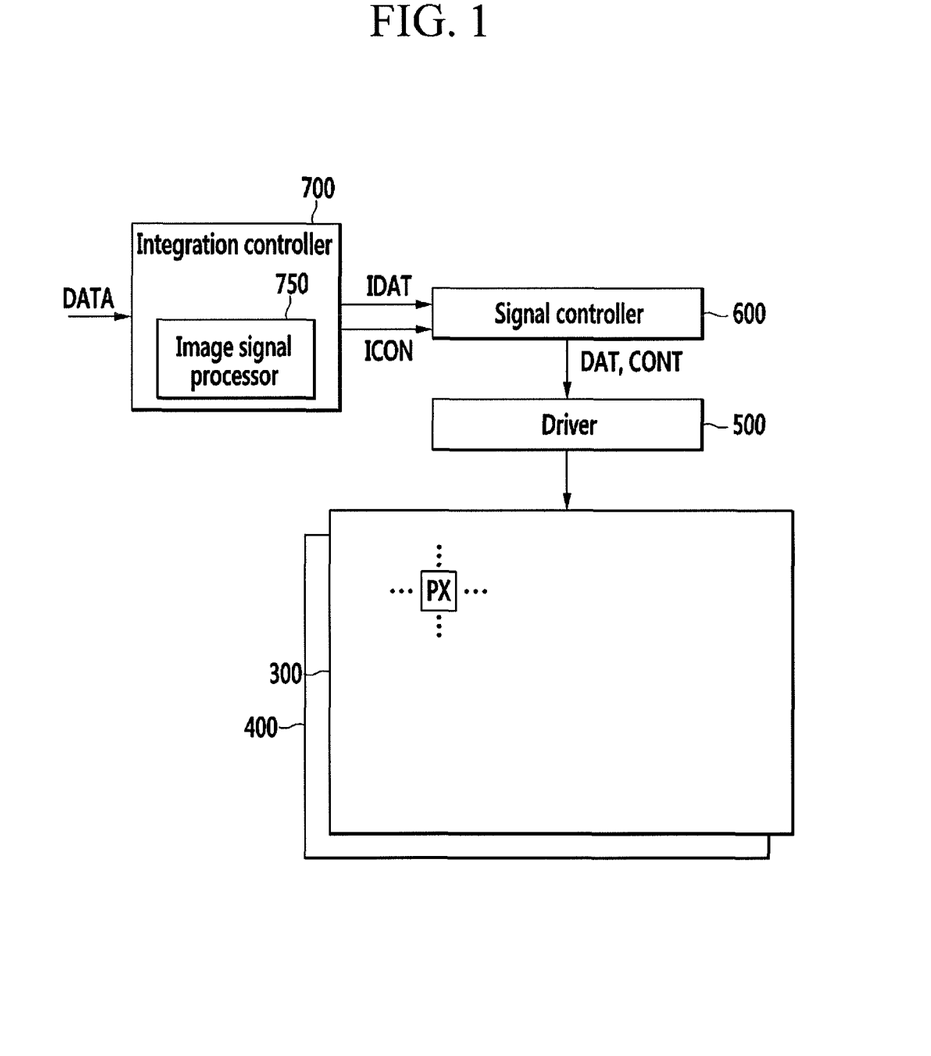
FIG. 1 illustrates a block diagram of a three-dimensional image display device according to an exemplary embodiment.

Firstly, a three-dimensional image display device according to an exemplary embodiment will be described with reference to FIG. 1. FIG. 1 is a block diagram of a three-dimensional image display device according to an exemplary embodiment.

A three-dimensional image display device according to an exemplary embodiment includes a display panel 300 to display an image, an optical system 400, at least one driver 500 connected to the display panel 300, a signal controller 600 controlling the driver 500, and an integration controller 700.

The display panel 300 may be a display panel included in various kinds of display devices, e.g., a liquid crystal display, an organic light emitting diode display, a plasma display, an electrophoresis display, and the like. The display panel 300 may include a light source.

The display panel 300 includes a plurality of signal lines and a plurality of pixels PX connected to the signal lines when viewed from an equivalent circuit. The plurality of pixels PX may be arranged substantially in a matrix form. The signal lines include a plurality of gate lines transferring gate signals (referred to as "scanning signals") and a plurality of data lines transferring data voltages. The plurality of gate lines may extend substantially in a row direction and be substantially parallel to each other. The plurality of data lines may extend substantially in a column direction and be substantially parallel to each other.

The pixel PX uniquely displays one of the primary colors (spatial division) or the plurality of pixels alternately display the primary colors over time (temporal division), and as a result, a desired color may be displayed by the spatial or temporal sum of the primary colors. An example of the primary colors may include three primary colors such as red, green, and blue. The plurality of adjacent pixels PX displaying different primary colors may configure one set (referred to as a dot) together. One dot may display a white image.

The optical system 400 is disposed between the display panel 300 and a viewer, and divides light of the image displayed by the display panel 300 into each viewpoint to be output. The viewer views different images by respective eyes at different viewpoints and thus may feel depth perception, i.e., a 3D effect.

The optical system 400 may include a plurality of lens (not shown) or parallax barriers (not shown) arranged in a row direction. An opening of each lens or each parallax barrier may be approximately elongated in a column direction, however it is not limited thereto, and may be inclined at a predetermined angle with respect to the row direction.

The driver 500 may include, for example, a gate driver and a data driver. The gate driver is connected to gate lines of the display panel 300, and sequentially applies gate signals configured by a combination of a gate-on voltage Von and a gate-off voltage Voff to the gate lines. The data driver is connected to data lines of the display panel 300 and converts the output image signal DAT into a data voltage to be applied to the data lines. The driver may be mounted to the three-dimensional image display device in a type of a tape carrier package or an integrated chip, or may be integrated together along with other electrical elements on the display panel 300.

The integration controller 700 receives image information DATA from the outside. The image information DATA may further include information for a kind of the image as to be displayed, e.g., a 2D image or a 3D image.

The integration controller 700 generates an input image signal IDAT and an input control signal ICON controlling the display of the input image signal IDAT based on the image information DATA, and transmits them to the signal controller 600. The input image signal IDAT may include luminance information, and the luminance may have a predetermined number of gray levels. The input image signal IDAT may include a 2D input image signal for displaying the 2D image and a 3D input image signal for displaying the 3D image. Thereafter, the input image signal IDAT is mainly represented as the 3D input image signal. The input control signal ICON may include a vertical synchronization signal Vsync, a horizontal synchronizing signal Hsync, a main clock signal MCLK, a data enable signal DE, and the like in accordance with the image display.

The 3D image display device according to the exemplary embodiment may include an image signal processor 750. The image signal processor 750 may be included in the integration controller 700. The image signal processor 750 may compensate degradation according to movement of the object of the 3D image when the input image information DATA is the image information for the 3D image.

A position of the image signal processor 750 is not limited to that illustrated in FIG. 1. For example, the image signal processor 750 may be disposed at other elements, e.g., such as the signal controller 600, or may be separate.

The signal controller 600 controls driving of the display panel 300. In more detail, the signal controller 600 receives the input image signal IDAT and the input control signal ICON from the integration controller 700, and controls the operation of the driver 500. The signal controller 600 appropriately processes the input image signal IDAT based on the input image signal IDAT and the input control signal ICON in accordance with an operational condition of the display panel 300 to generate an output image signal DAT, and generates various control signals CONT and the like to transfer the generated control signals CONT and the like to the driver 500.

Next, the three-dimensional image display device, particularly, the image signal processor 750 according to an exemplary embodiment, will be described with reference to FIG. 2 to FIG. 5, as well as FIG. 1.

Figure 2:
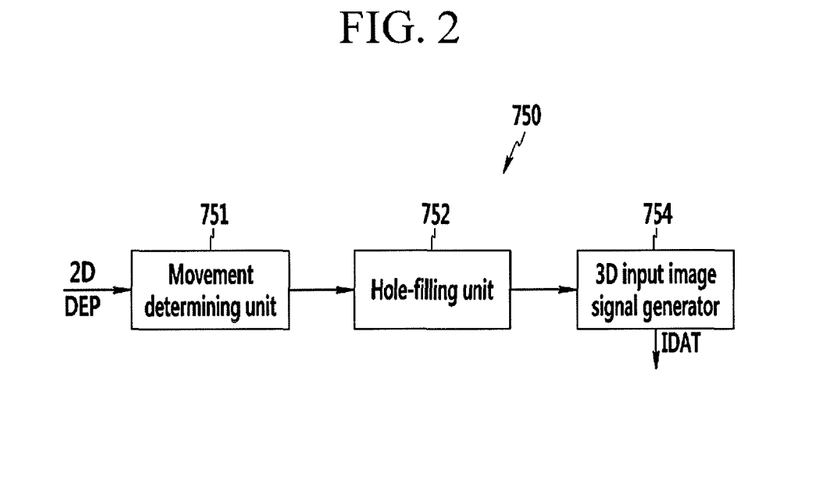
FIG. 2 illustrates a block diagram of an image processor of a three-dimensional image display device according to an exemplary embodiment.
Figure 3:
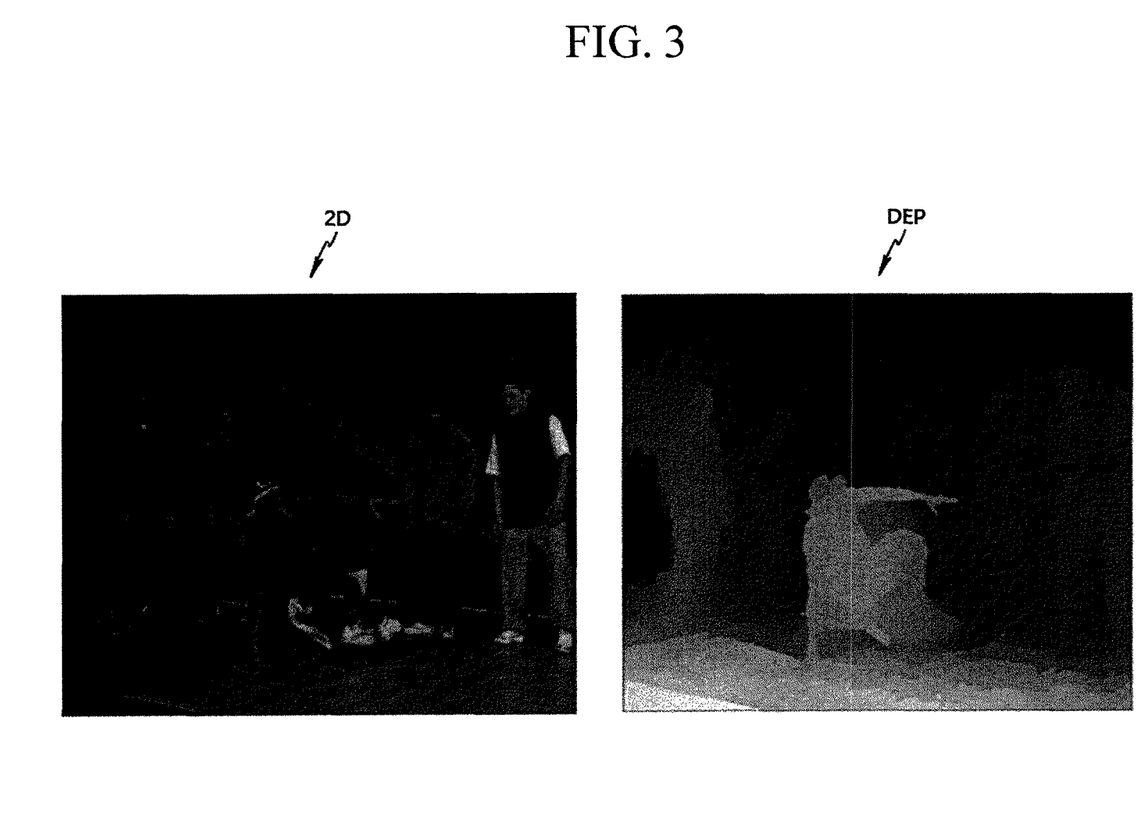
FIG. 3 illustrates an example of a 2D image and a depth information that are processed in a three-dimensional image display device according to an exemplary embodiment.
Figure 4:
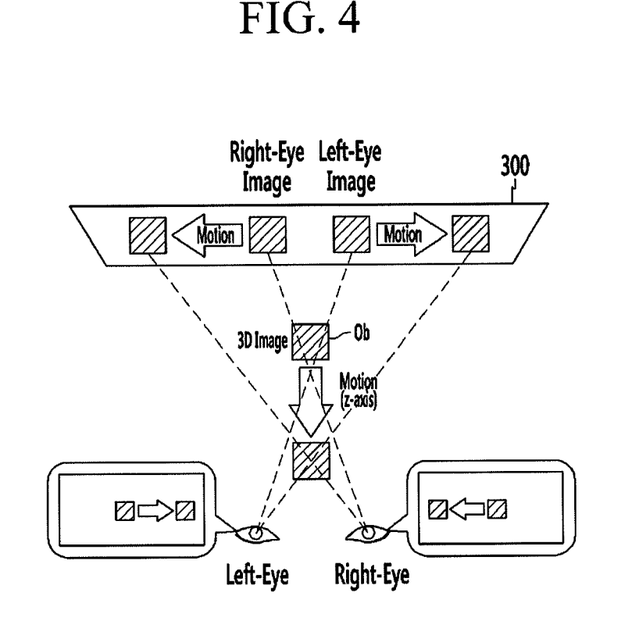
FIG. 4 illustrates movement of a left eye image and a right eye image that are respectively recognized in a left eye and a right eye when an object of a three-dimensional image is moved in a z-axis direction.
Figure 5:
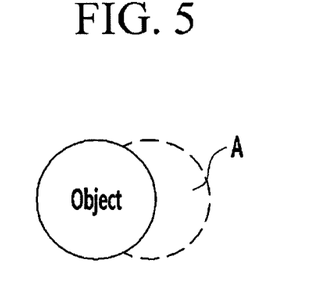
FIG. 5 illustrates a hole filling method according to a movement of an object when an object of a three-dimensional image is moved in a z-axis direction.

FIG. 2 is a block diagram of an image processor of a three-dimensional image display device according to an exemplary embodiment. FIG. 3 is a view of an example of a 2D image and depth information that are processed in a three-dimensional image display device according to an exemplary embodiment. FIG. 4 is a view showing a movement of a left eye image and a right eye image that are respectively recognized in a left eye and a right eye when an object of a three-dimensional image moved in a z-axis direction. FIG. 5 illustrates a hole filling method according to a movement of an object when an object of a three-dimensional image moved in a z-axis direction.

Referring to FIG. 1 and FIG. 2, the image signal processor 750 according to an exemplary embodiment includes a movement determining unit 751, a hole-filling unit 752, and a 3D input image signal generating unit 754.

The image information input in the image signal processor 750 may be 3D image information as the image information DATA input from the outside, and may include 2D image information 2D and depth information DEP. In the present exemplary embodiment, an example in which the image information includes the 2D image information 2D and the depth information DEP will be described.

Referring to FIG. 3, the 2D image information 2D is information for the 2D image, and the depth information DEP represents information on a depth of the 2D image, i.e., the protruding or receding degree from each portion. The depth information DEP includes a depth surface (referred to as a "depth map") representing the depth degree of the 2D image. Each dot of the depth surface may have unique 3D coordinates by the depth information DEP and 2D position information of the dot.

The depth information DEP may be represented as an 8-bit gray level image having a value from 0 to 255. In this case, a region that is farthest from the viewer may be represented as 0, a region that is closest to the viewer may be represented as 255, and an approximately middle gray level may be defined by a reference surface (a 2D surface).

The movement determining unit 751 determines whether the movement of the object along the z-axis direction is generated based on the image information of the 2D image information 2D and the depth information DEP. Here, the z-axis means a direction perpendicular to an xy surface that is the surface of the display panel 300. In this case, various movements sensing method, e.g., a block matching method, may be used. For example, when a difference of an edge of the object sensed in the continuous frame exists, movement along the z-axis direction may be determined.

Referring to FIG. 4, when the object Ob of the three-dimensional image moves in the z-axis direction, the left eye image and the right eye image of the object displayed by the display panel 300 move in opposite directions.

The hole-filling unit 752 fills a hole of the left eye image or the right eye image generated according to the movement of the object with an edge region of the object as a foreground when the movement determining unit 751 determines the object moved in the z-axis direction, and fills the hole generated at the left eye image and the right eye image of the object with a background when the movement determining unit 751 determines the object did not move in the z-axis direction. The hole of the object may be generated when the object is moved in directions other than the z-axis direction.

Referring to FIG. 5, when the object moved in the z-axis direction, the hole (A) of the left eye image or the right eye image of the current frame generated according to the movement of the object may be filled by copying an edge image information corresponding to the hole (A) among the edge region of the object of the previous frame. When the object did not move in the z-axis direction, the hole (A) may be filled with the background for natural image expression.

The 3D input image signal generating unit 754 generates the 3D input image signal IDAT by using the image information of the left eye image and the right eye image that are compensated in the hole-filling unit 752.

Figure 6:
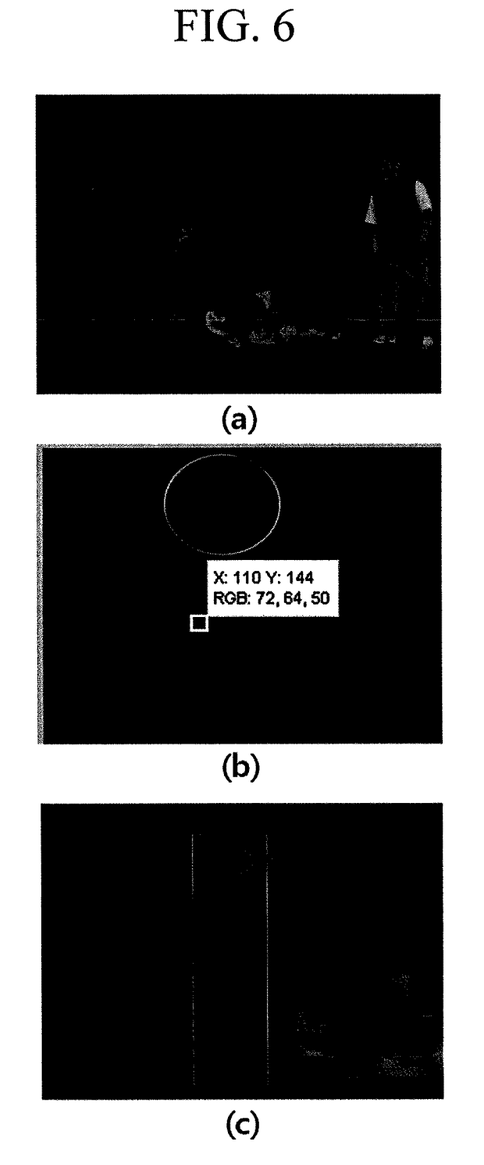
FIG. 6 illustrates a photo comparing a three-dimensional image displayed according to a conventional art and an image displayed by a three-dimensional image display device according to an exemplary embodiment.

FIG. 6 (*a*) is one example of the three-dimensional image. FIG. 6 (*b*) shows blurring of the three-dimensional image displayed when the object or the viewer is moved in the z-axis direction in the continuous frames.

For example, when a hold type of display device in which a data voltage charged to a pixel PX is maintained for a predetermined time, e.g., a liquid crystal display, displays the moving object, the edge of the object is blurred according to a response time of liquid crystal thereby generating the degradation. For example, in the liquid crystal display in a vertical alignment (VA) mode, a rising response time of the liquid crystal is longer than a falling response time such that both side edges of the object that is moved in a motion picture may appear with asymmetrical blurring.

FIG. 6 (*b*) shows that the blurring appears at the left side of the left edge of the object when a portion (a circled portion) of the object with brightness that is greater than its peripheries is moved in the right side.

In contrast, as shown in FIG. 6 (*c*), according to an exemplary embodiment, in the left eye image or the right eye image, when a portion (a rectangular portion) of the object with brightness that is greater than its peripheries is moved in the right side, the hole that is generated in proportion to the movement amount is filled with the edge of the object such that blurring does not appear at the left portion of the object. Accordingly, when the object of the three-dimensional image moves, resultant movement degradation, e.g., blurring, may be simply removed.

In this three-dimensional image display device according to an exemplary embodiment, the hole-filling may be realized in real time and the movement degradation may also be compensated in the case that the gray level of the object is the maximum gray level.

A three-dimensional image display method according to exemplary embodiments will be described with reference to FIG. 7, as well as the previously described drawings.

Figure 7:
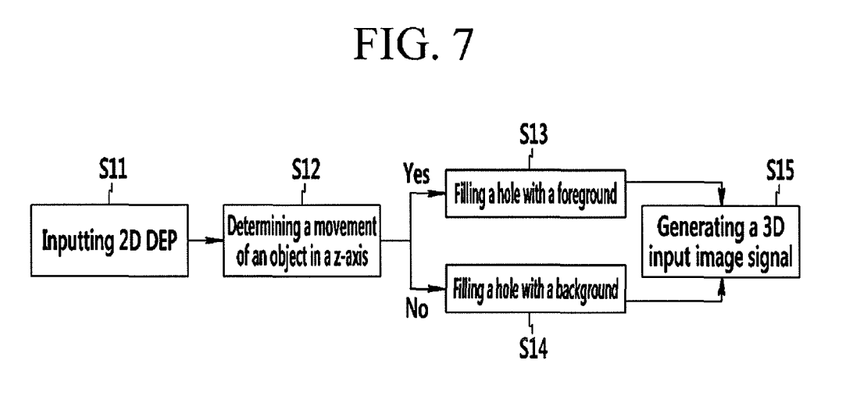
FIG. 7 illustrates a flowchart of an image processing method of a three-dimensional image display device according to the exemplary embodiment shown in FIG. 2.

FIG. 7 is a flowchart of an image processing method of a three-dimensional image display device according to the exemplary embodiment shown in FIG. 2. Referring to FIG. 7, as well as the previously described drawings, the image signal processor 750 receives the image information of the 2D image information 2D and the depth information DEP (S11).

Next, the movement determining unit 751 determines whether the object of the three-dimensional image has moved in the z-axis direction based on the image information (S12).

When the object of the three-dimensional image has moved in the z-axis direction, the hole-filling unit 752 fills the hole of the left eye image or the right eye image generated according to the movement of the object with the edge region of the object as the foreground (S13). When the object has not moved in the z-axis direction, the hole generated in the left eye image and the right eye image is filled with the background (S14).

Next, the 3D input image signal generating unit 754 generates the 3D input image signal IDAT by using the image information of the left eye image and the right eye image compensated in the hole-filling unit 752, and outputs it to the signal controller 600 (S15).

The signal controller 600 appropriately processes the 3D input image signal IDAT based on the 3D input image signal IDAT and the input control signal ICON in accordance with an operational condition of the display panel 300 to generate an output image signal DAT, and generates various control signals CONT and the like to transfer the generated control signals CONT and the like to the driver 500. The driver 500 generates the data voltage for the output image signal DAT and applies it to the data line of the display panel 300 and the gate-on voltage to the gate line to display the image according to the 3D input image signal IDAT.

Next, the three-dimensional image display device according to an exemplary embodiment will be described with reference to FIG. 8 to FIG. 11, as well as FIG. 1.

Figure 8:
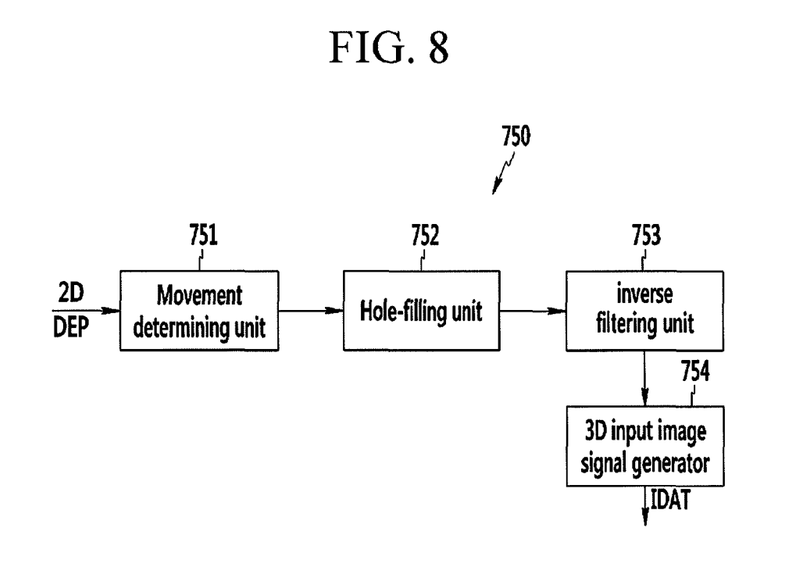
FIG. 8 illustrates a block diagram of an image processor of a three-dimensional image display device according to an exemplary embodiment.
Figure 9:
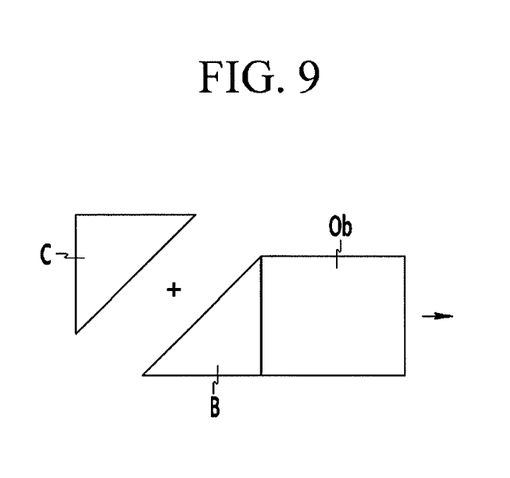
FIG. 9 illustrates one example of an inverse filtering method when an object is moved in a right side in a three-dimensional image display method according to an exemplary embodiment.
Figure 10:
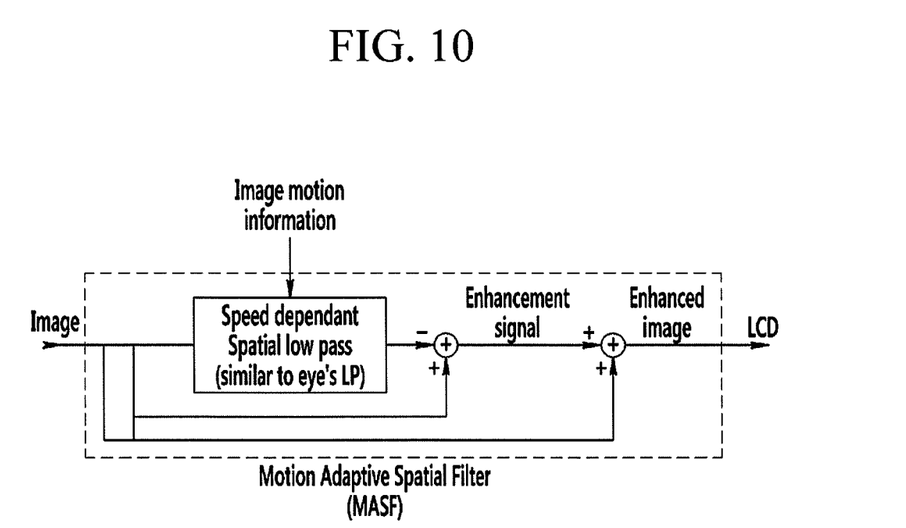
FIG. 10 illustrates one example of an inverse filtering method used in a three-dimensional image display method according to an exemplary embodiment.
Figure 11:
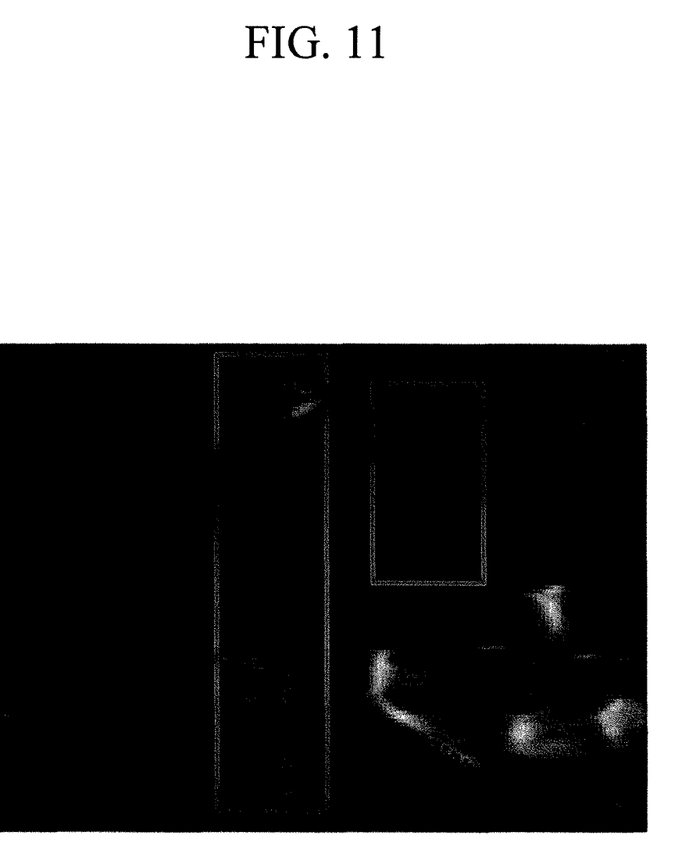
FIG. 11 illustrates a photo of an image displayed by a three-dimensional image display device according to an exemplary embodiment.

FIG. 8 is a block diagram of an image processor of a three-dimensional image display device according to an exemplary embodiment. FIG. 9 is a view showing one example of an inverse filtering method when an object is moved to a right side in a three-dimensional image display method according to an exemplary embodiment. FIG. 10 is a view showing one example of an inverse filtering method used in a three-dimensional image display method according to an exemplary embodiment. FIG. 11 is a photo of an image displayed by a three-dimensional image display device according to an exemplary embodiment.

Referring to FIG. 8, the three-dimensional image display device according to the present exemplary embodiment is the same as most of the previous exemplary embodiment, however the image signal processor 750 may further include an inverse filtering unit 753.

That is, the image signal processor 750 may include the movement determining unit 751, the hole-filling unit 752, the inverse filtering unit 753, and the 3D input image signal generating unit 754. The descriptions of the movement determining unit 751, the hole-filling unit 752, and the 3D input image signal generating unit 754 is the same as those of the previous exemplary embodiment such that the detailed descriptions are omitted.

The inverse filtering unit 753 may further compensate the movement degradation to the movement degradation compensation by the processing in the hole-filling unit 752. The inverse filtering unit 753 may remove the blurring of the edge in the side opposite to the movement direction among the edge of the object when the luminance of the moving object is higher than the luminance of the background, or the blurring near the edge of the movement direction among the edge of the moving object when the luminance of the moving object is lower than the luminance of the background.

When the object is moved to the right side in the left eye image or the right eye image and the luminance of the moving object is higher than the luminance of the background, the blurring near the left edge of the object may be removed. When the object is moved to the right side in the left eye image or the right eye image and the luminance of the moving the object is lower than the luminance of the background, the blurring of the right edge of the object may be removed.

Accordingly, in the case that the object is moved in the left eye image or the right eye image, if the degradation of the left edge of the object is compensated by the hole-filling unit 752, the left edge of the object is further emphasized by the inverse filtering unit 753 when the luminance of the moving object is higher than the luminance of the background, such that the display quality of the motion picture of the 3D image may be further improved, and the blurring near the right edge of the moving object may also be removed when the luminance of the moving object is lower than the luminance of the background.

Referring to FIG. 9, one example of the operation of the inverse filtering unit 753 will be described in detail.

In the hold type of display device, e.g., a liquid crystal display, when the object is moved, the afterimage of the object remains at the side opposite to the movement direction or the side of the movement direction, thereby generating the blurring, and this may be a low pass filter effect according to a moving speed of the object.

Referring to FIG. 9, when the object Ob of a quadrangle having a predetermined luminance is moved with a predetermined speed in one direction, e.g., a right side, through the background of a predetermined gray level, will be described. Also, it is assumed that a characteristic of a converting element like the liquid crystal of the display device is linear. The luminance recognized by the observer may be expressed as a periodic function for a time such that the image recognized by the observer is formed by integration of the luminance of the image of the object Ob of each frame.

In FIG. 9, 'B' represents the afterimage data of the object Ob by the integration of the luminance according to the time. The afterimage data B may be changed according to an element such as a width, a moving speed, and luminance of the object Ob. The afterimage data B may be luminance information after the information of the predetermined frequency region is lost due to the low pass filter effect.

The inverse filtering unit 753 according to an exemplary embodiment as a motion-adaptive spatial filter generates compensation data C emphasizing the frequency region lost due to the low pass filter effect and adds the compensation data C to the position where the afterimage data B appears to emphasize the edge of the object Ob. The compensation data C may be information of an inverse shape of the afterimage data B, and is changed according to the moving speed of the object Ob.

FIG. 10 shows the compensation operation performed by the inverse filtering unit 753 in the liquid crystal display (LCD). The blurring according to the movement of the object Ob, i.e., the afterimage data B, is predicted through the image information, and the inverse filter data to be compensated, i.e., the compensation data C, is extracted according to the afterimage data B. The inverse filtering unit 753 may add the compensation data C to the image information of the object of the previous frame to compensate the movement degradation.

Referring to FIG. 11, as described above, when the portion (the left quadrangle portion) that is brighter than the surroundings in the left eye image or the right eye image is moved, the hole generated in proportion to the movement amount is filled with the edge of the object by the hole-filling unit 752 such that the blurring is not shown at the left portion of the object.

Simultaneously, according to the present exemplary embodiment, when the portion (the right quadrangle portion) that is darker than the surroundings in the left eye image or the right eye image moves, the luminance of the background around the edge of the object is increased by the compensation data by the inverse filtering unit 753 such that the blurring near the right edge of the object is reduced. Accordingly, when the movement in the z-axis direction of the object of the three-dimensional image is generated, the blurring disappears in both the left side and the right side of the object and the movement degradation may be reduced.

Figure 12:
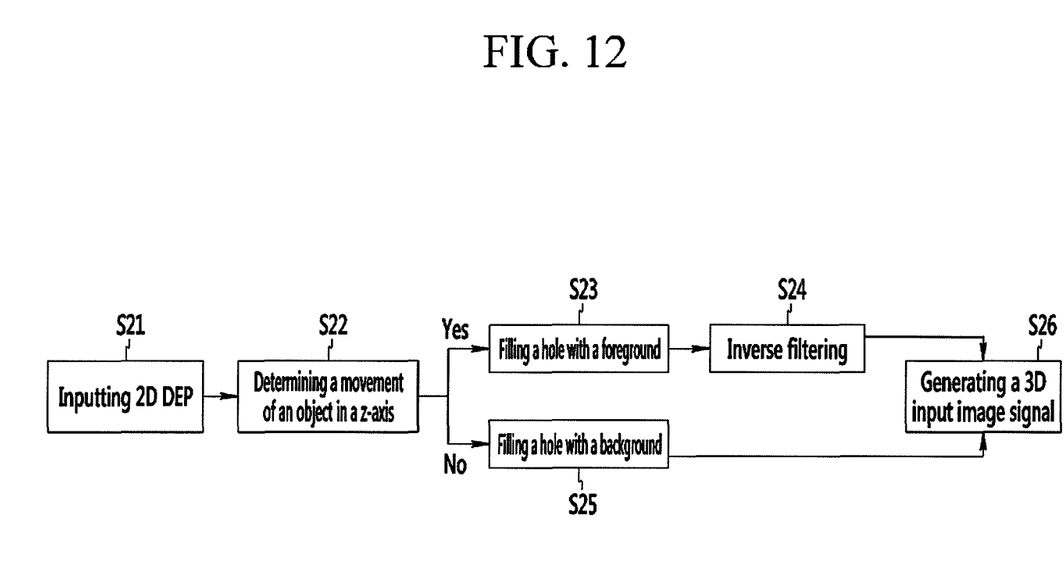
FIG. 12 illustrates a flowchart of an image processing method of a three-dimensional image display device according to the exemplary embodiment shown in FIG. 8.

Next, the three-dimensional image display method according to an exemplary embodiment will be described with reference to FIG. 12, as well as the previously described drawings. FIG. 12 is a flowchart of an image processing method of a three-dimensional image display device according to the exemplary embodiment shown in FIG. 8.

Referring to FIG. 12 along with FIG. 8, the image signal processor 750 receives the image information such as the 2D image information 2D and the depth information DEP (S21).

Next, the movement determining unit 751 determines whether the object of the three-dimensional image moved along the z-axis direction based on the image information (S22).

When the object of the three-dimensional image moved along the z-axis direction, the hole-filling unit 752 fills the hole generated according to the movement of the object with the edge region of the object as the foreground S23. Additionally, the inverse filtering unit 753 generates the inverse filter data, i.e., the compensation data C for the object Ob, based on the image information and adds it to the image information, thereby reinforcing the movement degradation compensation of the object Ob through the inverse filtering (S24).

When the object has not moved along the z-axis direction, the hole of the object in the left eye image or the right eye image is filled with the background (S25).

Next, the 3D input image signal generating unit 754 generates the 3D input image signal IDAT by using the image information of the left eye image and the right eye image to which the movement degradation is compensated and outputs it to the signal controller 600 (S26).

The signal controller 600 appropriately processes the 3D input image signal IDAT based on the 3D input image signal IDAT and the input control signal ICON in accordance with an operational condition of the display panel 300 to generate an output image signal DAT, and generates various control signals CONT and the like to transfer the generated control signals CONT and the like to the driver 500. The driver 500 generates the data voltage for the output image signal DAT and applies it to the data line of the display panel 300, and applies the gate-on voltage to the gate line to display the image according to the 3D input image signal IDAT.

By way of summation and review, embodiments provide a three-dimensional image display device simply removing a movement degradation of an object, and a display method of a three-dimensional image. Particularly, a three-dimensional image display device simply removing movement degradation, e.g., blurring, that may appear when displaying the three-dimensional image by a hold type of display device, e.g., a liquid crystal display, and a display method of a three-dimensional image are provided.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A three-dimensional image display device, comprising:
a display panel for displaying a 3D image;
a movement determiner determining whether an object of a 3D image is moved in a first direction perpendicular to a surface of the display panel based on image information of the 3D image;

a hole filler connected to the movement determiner and filling a hole generated according to the movement of the object with an edge region of the object to compensate a movement degradation when the object is determined to have moved in the first direction;

a 3D input image signal generator connected to the hole filler and generating a 3D input image signal based on the image information compensated for the movement degradation; and an inverse filter connected to the hole filler and generating compensation data depending on a speed of the movable object and adding the compensation data to the image information, wherein the compensation data has an inverse shape of an afterimage data due to the movement of the object, and wherein, when the object moved in the first direction, luminance of the object is lower than luminance of the background, and when the object moved in a second direction in a plane substantially parallel to the surface of the display panel, the inverse filter adds, to the image information, the compensation data for the afterimage data of the background around the edge region of the object at a side of the second direction.

2. The three-dimensional image display device as claimed in claim 1, wherein the inverse filter adds the compensation data to the image information of the object of a previous frame.

3. A three-dimensional image display device, comprising:
a display panel for displaying a 3D image;
a movement determiner determining whether an object of a 3D image is moved in a first direction perpendicular to a surface of the display panel based on image information of the 3D image;
a hole filler connected to the movement determiner and filling a hole generated according to the movement of the object with an edge region of the object to compensate a movement degradation when the object is determined to have moved in the first direction;
a 3D input image signal generator connected to the hole filler and generating a 3D input image signal based on the image information compensated for the movement degradation; and
an inverse filter connected to the hole filler and generating compensation data depending on a speed of the movable object and adding the compensation data to the image information, wherein the compensation data has an inverse shape of an afterimage data due to the movement of the object, wherein the inverse filter adds the compensation data to the image information of the object of a previous frame, and wherein, when the object moved in the first direction, luminance of the object is higher than luminance of the background, and when the object moved in a second direction in a plane substantially parallel to the surface of the display panel, the inverse filter adds, to the current image information, the compensation data for the afterimage data of the edge region of the object at a side opposite to the second direction.

4. A method displaying a three-dimensional image, comprising:
determining whether an object of a 3D image moves in a first direction perpendicular to a surface of a display panel based on image information of the 3D image;
compensating a movement degradation when it is determined that the object moved in the first direction by filling a hole generated according to the movement of the object with an edge region of the object;
generating a 3D input image signal based on the image information compensated with the movement degradation; and
inverse filtering compensation data depending on a speed of the movable object and adding the compensation data to the image information, wherein the compensation data has an inverse shape of afterimage data by the movement of the object, and wherein, when the object moved in the first direction, luminance of the object is lower than luminance of the background, and when the object moved in a second direction in a plane substantially parallel to the surface of the display panel, inverse filtering includes adding, to the image information, the compensation data for the afterimage data of the background around the edge region of the object at a side of the second direction.

5. The method as claimed in claim 4, wherein the inverse filtering includes adding the compensation data to the image information of the object of a previous frame.

6. A method displaying a three-dimensional image, comprising:
determining whether an object of a 3D image moves in a first direction perpendicular to a surface of a display panel based on image information of the 3D image;
compensating a movement degradation when it is determined that the object moved in the first direction by filling a hole generated according to the movement of the object with an edge region of the object;
generating a 3D input image signal based on the image information compensated with the movement degradation; and
inverse filtering compensation data depending on a speed of the movable object and adding the compensation data to the image information, wherein the compensation data has an inverse shape of afterimage data by the movement of the object, wherein the inverse filtering includes adding the compensation data to the image information of the object of a previous frame, and wherein, when the object moved in the first direction, luminance of the object is higher than luminance of the background, and when the object moved in a second direction in a plane substantially parallel to the surface of the display panel, inverse filtering includes adding, to the image information, the compensation data for the afterimage data of the edge region of the object at a side opposite to the second direction.

* * * * *